United States Patent [19]

Leitz

[11] Patent Number: 4,509,269
[45] Date of Patent: Apr. 9, 1985

[54] TARGET FOR MEASUREMENTS WITH ANGLE-MEASURING INSTRUMENTS

[75] Inventor: Helmut Leitz, Konigsbronn, Fed. Rep. of Germany

[73] Assignee: Carl-Zeiss-Stiftung, Oberkochen, Fed. Rep. of Germany

[21] Appl. No.: 480,815

[22] Filed: Mar. 31, 1983

[30] Foreign Application Priority Data

Apr. 22, 1982 [DE] Fed. Rep. of Germany ....... 3214998

[51] Int. Cl.³ ............................................. G01C 15/06
[52] U.S. Cl. ......................................... 33/293; 33/263
[58] Field of Search ................. 33/293, 294, 295, 296, 33/1 H, 286, 287, 263, 227

[56] References Cited

U.S. PATENT DOCUMENTS 969,732  9/1910  Tebyrica ............................... 33/295
2,058,998 10/1936 Koulichkov ........................... 33/296

Primary Examiner—William D. Martin, Jr.
Attorney, Agent, or Firm—Hopgood, Calimafde, Kalil, Blaustein & Judlowe

[57] ABSTRACT

The invention contemplates a target device for marking inaccessible measuring points on industrial objects such as, for example, an airplane fuselage which is to be measured for coordinates of certain points on its surface, using a pair of theodolites.

The target device consists of a rod-shaped holder (1) on which two spherical target marks (4, 5) are so arranged that the measurement point lies on the extension of the line connecting the target marks, and at known offset from the measurement point.

For attachment to the object (12) to be measured, the holder (1) employs removable adapters, such as threaded bolts (3).

14 Claims, 2 Drawing Figures

TARGET FOR MEASUREMENTS WITH ANGLE-MEASURING INSTRUMENTS

BACKGROUND OF THE INVENTION

The present invention relates to a target device for marking inaccessible measurement points or measurement points which are difficult to sight with angle-measuring instruments.

Recently, methods of operating with geodetic angle-measuring instruments have been established for measuring larger industrial objects. Points to be measured on such objects are sighted by at least two different theodolites, and the coordinates of the target points are determined from the theodolite measurements.

For ease of recognition, it is known to characterize target points by adhesive markings, or by projecting a light spot onto the target point. This type of marking is, however, problematical when the sight line and the object surface to be measured form an acute angle, since in such case the target marks, which necessarily cover an area, are distorted in perspective and can no longer be brought into precise coincidence with the sighting cross hairs of the measuring instrument. This leads to inaccurate measurements.

It is furthermore known to use targets in the form of vertically suspended balls illuminated from below for measurement purposes in mining (West German Pat. No. 441,880). Such targets can, however, be used only for the marking of bottom sides, and their pendulum suspension renders them sensitive to vibration.

BRIEF STATEMENT OF THE INVENTION

The object of the present invention is to provide a target for the marking of inaccessible measurement points or measurement points which are difficult to sight, the target being of universal use and lending itself to accurate marking of even those surfaces which are inclined at an acute angle to the sight line.

The invention achieves this object by projecting a target device which can be removably applied to any point to be measured. The device is configured to position two preferably spherical targets (target marks) on an axis through the point to be measured, at known spacing from each other and from the point to be measured.

Since the two targets of the device are both on the axial alignment which intersects the point to be measured, it is possible, after determination of the coordinates of each of the two target marks, to unequivocally determine the position of the point to be measured. At the same time, the precision with which the marks are sighted can be checked by comparing the difference in the measured coordinate values with the known fixed spacing of the target marks. Such checking enables a verification of the measurement process which substantially excludes measurement errors.

In order that the target marks may always offer the same outline when sighted from different directions, the target marks are suitably developed as three-dimensional bodies of high symmetry, preferably balls or cylinders. Balls of aluminum oxide, for instance, can be used as target marks, and they are commercially obtainable with good quality and at low price.

DETAILED DESCRIPTION

Figure 1:
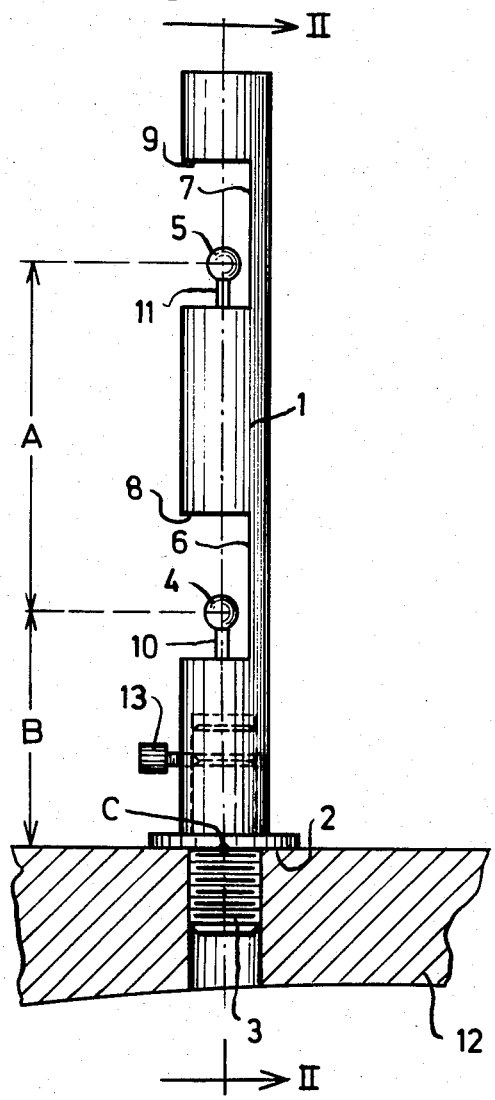
Figure 2:
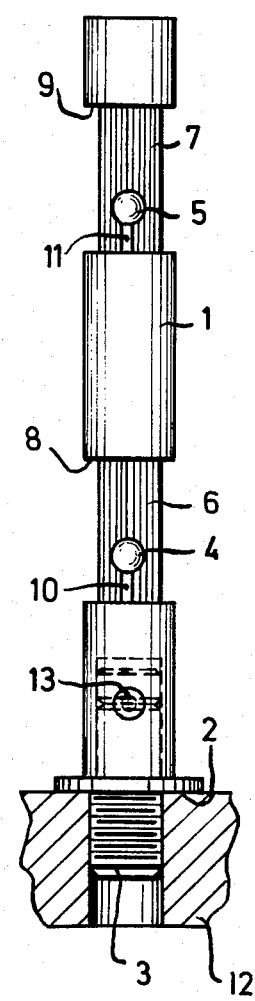

The target device of the invention will be illustratively described in detail in conjunction with the accompanying drawings, in which:

FIG. 1 is a side view in elevation, in mounted position at a point to be measured on the surface of a body, the body being shown in section; and FIG. 2 is a front view in elevation, from the aspect II—II of FIG. 1.

The target device shown consists of a cylindrical rod 1 having two cutouts 8 and 9 which are arranged one above the other. Within each of these cutouts, a target or measurement mark in the shape of a ball 4 (5) is fixedly mounted at spacing A on the rod axis, by means of a pin 10 (11); and balls 4, 5 are suitably of aluminum oxide and, therefore, white. The white target balls 4, 5 are easy to recognize against color-painted wall parts 6, 7 of the cutouts 8, 9, and can be sighted with high precision.

At its lower end, rod 1 removably seats on the flange 2 of a threaded bolt 3, the upper end of which is a stud having telescopic fit to a mounting bore on the axis of rod 1. This threaded bolt serves for removably mounting the target device at threaded boreholes whose positions are to be measured.

Rod 1 is adjustably rotatable with respect to the threaded bolt 3, in order to permit different sightings of balls 4, 5 even from opposite directions, and a set screw 13 retains a given adjustment. The threaded bolt 3 will be understood to be replaceably mounted and that it may be one of a series of bolts of different thread diameter, but with stud portions to fit the mounting bore of rod 1; it will also be understood that, depending on the sighting situation, bolt 3 may be replaced by centering cones, magnetic feet, etc., each with its stud portion to accommodate rod 1, so that the same target device may be employed at a large number of differently shaped measurement points.

The two balls 4 and 5 are spaced at a precisely measured distance A and are on the rod axis which also contains the measurement point C on the surface of the measurement object 12. Specifically, point C is at the intersection between the axis of the threaded bore and the surface of the measurement object 12. The distance B from measurement point C to the nearest ball 4 is also exactly known.

Upon measurement, the respective coordinates of balls 4 and 5 are determined by two spaced angle-measuring instruments. From this, the direction of the connecting line 4–5 can be determined, and, by comparison with the known distance A, it can be checked that the balls 4 and 5 have been accurately sighted.

Having ascertained axis direction in this way, and knowing the fixed distance B, the true coordinates of the measurement point C can be readily calculated. It will be understood that such calculations can be carried out automatically while sighting the pair of balls of the next target location, using a computer which is coupled to the angle-measuring instruments used for the measurements.

What is claimed is:

1. A target device for marking a measuring point (C) on the surface of an object which is difficult to sight with an angle-measuring instrument, said device comprising an elongate rigid rod having a base end, a radial flange at the base end and means beneath the flange for securing the rod to the object with the flange abutting the surface of the object and with the axis of the rod centered at the point to be measured, a first measurement mark fixed to said rod at a first predetermined offset from the intersection of the rod axis with the radial plane of the underside of said flange, and a second measurement mark fixed to said rod at a second predetermined offset from the underside of said flange, the centers of said marks being in fixed alignment with said intersection of the rod axis with said radial plane.

2. A target according to claim 1, characterized by the fact that the measurement-target marks are developed as three-dimensional bodies of high symmetry.

3. A target according to claim 2, characterized by the fact that balls are used as measurement-target marks.

4. A target according to claim 2, characterized by the fact that cylindrical bodies are used as measurement-target marks.

5. A target according to claim 1, characterized by the fact that the measurement-target marks are of aluminum oxide.

6. A target according to claim 1, characterized by the fact that the measurement marks are fixedly mounted in cutouts of said rod, the inner cutout surfaces being in color contrast with the measurement marks.

7. A target according to claim 6, characterized by the fact that said rod is mounted for rotation about the rod axis with respect to said means beneath the flange.

8. A target according to claim 1, characterized by the fact that said means beneath the flange is developed as a removable threaded bolt.

9. A target according to claim 1, characterized by the fact that said means beneath the flange is developed as a cone.

10. A target according to claim 1, characterized by the fact that said means beneath the flange is developed as an adherence magnet.

11. A target device for marking an object surface with a measuring point C which is inaccessible or difficult to sight with angle-measuring instruments, said device comprising a rod member having cutouts at two spaced locations, the cutouts being of such depth as to traverse the rod axis, a sighting ball fixedly mounted on the rod axis in each cutout, and an adapter member for precise mounting to the object surface at the point C, said rod member and said adapter member having removable telescoping fit to each other in such manner that point C is on the rod axis and that said balls are at known offset from point C.

12. A target device for marking a measuring point (C) on the surface of an object which is difficult to sight with an angle-measuring instrument, said device comprising an elongate rigid rod having a base end, a radial flange at the base end and means beneath the flange for securing the rod to the object with the flange abutting the surface of the object and with the axis of the rod centered at the point to be measured, said rod being characterized by first and second recesses of depth greater than the radius but less than the diameter of the rod, said recesses being spaced from each other and from said flange, and a fixed measurement mark in each of said recesses, the center of each of said measurement marks being on the axis of said rod and therefore in alignment with the measuring point (C) regardless of the aspect from which said measuring points are sighted within the angular range of their remote visibility.

13. A target device for marking a measuring point (C) on the surface of an object which is difficult to sight with an angle-measuring instrument, said device comprising an elongate rigid rod having a base end, a radial flange at the base end and means beneath the flange for securing the rod to the object with the flange abutting the surface of the object and with the axis of the rod centered at the point to be measured, said rod being recessed to depth greater than the radius but less than the diameter of the rod, the recessing of said rod being spaced from said flange, and two fixedly spaced measurement marks in the recessing of said rod, the center of each of said measurement marks being on the axis of said rod and therefore in alignment with the measuring point (C) regardless of the aspect from which said measuring points are sighted within the angular range of their remote visibility.

14. A target device for marking a measuring point (C) on the surface of an object which is difficult to sight with an angle-measuring instrument, said device comprising an elongate rigid body having a base end, a circular flange at the base end and means beneath the flange for securing the body to the object with the flange abutting the surface of the object and with the central axis of the flange centered at the point to be measured, a first measurement mark fixed to said body at a first predetermined offset from the intersection of the flange axis with the radial plane of the underside of said flange, and a second measurement mark fixed to said body at a second predetermined offset from the underside of said flange, the centers of said marks being in fixed alignment with said intersection of the flange axis with said radial plane.

* * * * *